US012759712B2

(12) United States Patent
Meis et al.

(10) Patent No.: US 12,759,712 B2
(45) Date of Patent: Oct. 13, 2026

(54) AIRCRAFT ICE ACCRETION DETECTION BASED ON MEASURING DENSITY

(71) Applicant: The Boeing Company, Arlington, VA (US)

(72) Inventors: Charles Meis, Renton, WA (US); Rachel Darr, Maple Valley, WA (US)

(73) Assignee: The Boeing Company, Arlington, VA (US)

( * ) Notice: Subject to any disclaimer, the term of this patent is extended or adjusted under 35 U.S.C. 154(b) by 191 days.

(21) Appl. No.: 18/747,958

(22) Filed: Jun. 19, 2024

(65) Prior Publication Data

US 2025/0388329 A1 Dec. 25, 2025

(51) Int. Cl.
*B64D 15/22* (2006.01)

(52) U.S. Cl.
CPC .................................... *B64D 15/22* (2013.01)

(58) Field of Classification Search
CPC ................................ B64D 15/20; B64D 15/22
See application file for complete search history.

(56) References Cited

U.S. PATENT DOCUMENTS 5,191,791 A * 3/1993 Gerardi ............... G01M 5/0083 73/178 R
5,398,547 A * 3/1995 Gerardi .................. G08B 19/02 340/580
8,907,798 B2 12/2014 Meis et al.
12,577,910 B1 * 3/2026 Yazici ..................... F02C 7/047
2002/0158768 A1 * 10/2002 Severson ............... B64D 15/20 340/580
2009/0294593 A1 12/2009 Jacquet-Francillon et al.
2011/0068230 A1 3/2011 Severson et al.
2014/0184789 A1 7/2014 Meis et al.
2018/0257786 A1 * 9/2018 Thorez ............... G01N 15/0227
2020/0217300 A1 7/2020 Stähler

FOREIGN PATENT DOCUMENTS

CN 114104300 A * 3/2022 ............. B64D 15/22
DE 102013106947 A1 1/2015

OTHER PUBLICATIONS

Cao, Yihua, et al. "Numerical simulation of ice accretions on an aircraft wing." Aerospace Science and Technology 23.1 (2012): 296-304. (Year: 2012).*
European Patent Office, Extended European Search Report Issued in Application No. 25170397.1, Aug. 13, 2025, Germany, 9 pages.

* cited by examiner

*Primary Examiner* — Michael D Masinick
(74) *Attorney, Agent, or Firm* — Alleman Hall LLP

(57) ABSTRACT

Examples are disclosed that relate to a method for detecting ice accretion present on an aircraft. In one example, a depth signal indicating a depth of water and/or ice collected on a baseplate in a collection chamber of an aircraft ice detector is received from a depth sensor. A mass signal indicating a mass of the water and/or ice collected on the baseplate is received from a mass sensor. A volume of the water and/or ice collected on the baseplate is calculated based on the depth signal and dimensions of the baseplate. A density of the water and/or ice collected on the baseplate is calculated based on the mass signal and the calculated volume of the water and/or ice collected on the baseplate. An ice accretion signal is output based on the calculated density of the water and/or ice collected on the baseplate being less than a threshold density.

20 Claims, 8 Drawing Sheets

AIRCRAFT ICE ACCRETION DETECTION BASED ON MEASURING DENSITY

FIELD

The present disclosure relates generally to detecting ice accretion conditions and, more particularly, to detecting ice accretion conditions present on a surface of an aircraft.

BACKGROUND

Ice accretion on an airfoil surface of an aircraft (e.g., wing, horizontal stabilizer, vertical stabilizer) can have significant impacts on lift and drag characteristics of the aircraft. Thus, the real-time detection of ice accretion on an airfoil surface of an aircraft can be utilized to make suitable adjustments in operation of the aircraft for flight in such conditions. The method of real-time detection of ice accretion can vary between aircraft, but many commercial transport-category aircraft presently use a conventional ice accretion sensor that comprises a sensor probe designed to collect supercooled water droplets on the probe surface. Such a conventional ice accretion sensor is not installed in the immediate vicinity of an airfoil surface that is susceptible to ice accretion, and instead is installed on the forward fuselage section of the aircraft. This is because the probe of the conventional ice accretion sensor extends beyond the aerodynamic boundary layer of the aircraft and could interfere with airflow across the airfoil surface if the ice accretion sensor were positioned in the immediate vicinity of the airfoil surface. Since the conventional ice accretion sensor is only located on the forward fuselage section of the aircraft, the conventional ice accretion sensor is not capable of detecting ice accretion that is localized to different regions of the airfoil surface of the aircraft.

Furthermore, when operating in conditions at ambient temperatures just below freezing, ice accretion may form on the leading edge of an airfoil surface prior to ice accretion forming on the sensor probe of the conventional ice accretion sensor. As a result, the conventional ice accretion sensor may not detect ice accretion in a timely manner under such conditions.

SUMMARY

Examples are disclosed that relate to detecting ice accretion present on a surface of an aircraft. In one example, a depth signal indicating a depth of water and/or ice collected on a baseplate in a collection chamber of an aircraft ice detector is received from a depth sensor. A mass signal indicating a mass of the water and/or ice collected on the baseplate is received from a mass sensor. A volume of the water and/or ice collected on the baseplate is calculated based at least on the depth signal. A density of the water and/or ice collected on the baseplate is calculated based at least on the mass signal and the calculated volume of the water and/or ice collected on the baseplate. An ice accretion signal is output based on the calculated density of the water and/or ice collected on the baseplate being less than a threshold density. The ice accretion signal indicates that there is ice accretion present on the surface of the aircraft at a location of the aircraft ice detector.

The features and functions that have been discussed can be achieved independently in various embodiments or may be combined in yet other embodiments, further details of which can be seen with reference to the following description and drawings.

DETAILED DESCRIPTION

Figure 1:
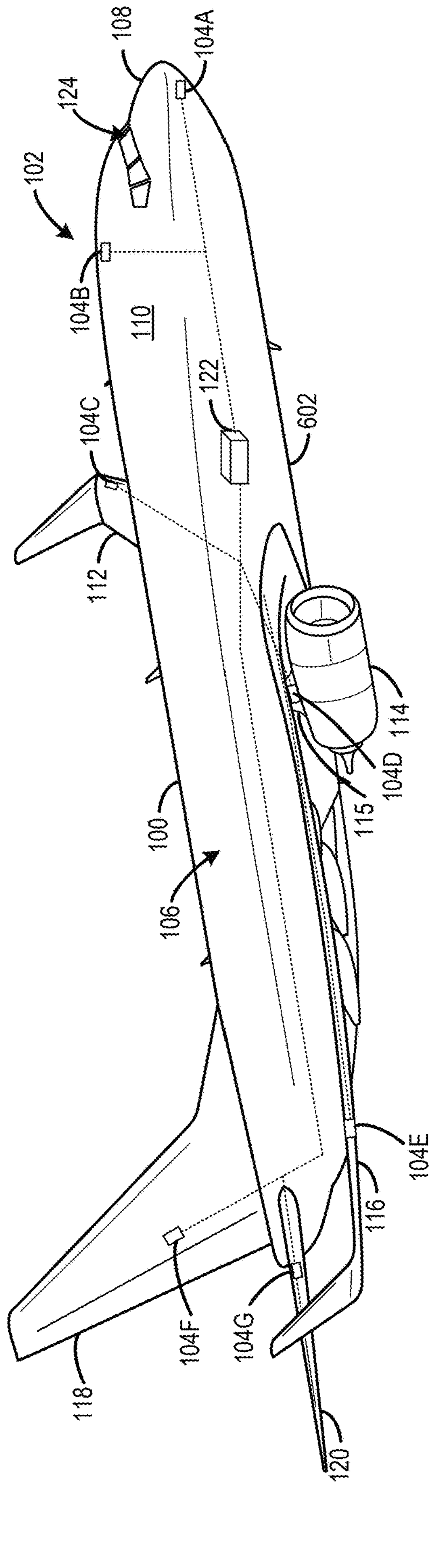
FIG. 1 shows an example aircraft comprising an ice detection system according to an embodiment of the present disclosure.

A conventional ice accretion sensor comprises a sensor probe designed to collect supercooled water droplets on the probe surface. Such a conventional ice accretion sensor is not installed in the immediate vicinity of an airfoil surface (e.g., wing, horizontal stabilizer, vertical stabilizer) that is susceptible to ice accretion, and instead is installed on the forward fuselage section of the aircraft. This is because the probe of the conventional ice accretion sensor extends beyond the aerodynamic boundary layer of the aircraft and could interfere with airflow across the airfoil surface if the ice accretion sensor were positioned in the immediate vicinity of the airfoil surface. Since the conventional ice accretion sensor is only located on the forward fuselage section of the aircraft, the conventional ice accretion sensor is not capable of detecting ice accretion that is localized to different regions of the airfoil surface of the aircraft.

Furthermore, when operating in environmental conditions at ambient temperatures just below freezing, ice accretion may form on the leading edge of an airfoil surface prior to ice accretion forming on the sensor probe of the conventional ice accretion sensor. As a result, a conventional ice protection system may not detect ice accretion in a timely manner under such conditions.

Accordingly, examples are disclosed that relate to detecting ice accretion present on a surface of an aircraft by measuring the density of collected water and/or ice on the surface of the aircraft. In one example, a depth signal indicating a depth of water and/or ice collected on a baseplate in a collection chamber of an aircraft ice detector is received from a depth sensor. A mass signal indicating a mass of the water and/or ice collected on the baseplate is received from a mass sensor. A volume of the water and/or ice collected on the baseplate is calculated based at least on the depth signal. A density of the water and/or ice collected on the baseplate is calculated based at least on the mass signal and the calculated volume of the water and/or ice collected on the baseplate. An ice accretion signal is output based on the calculated density of the water and/or ice collected on the baseplate being less than a threshold density. The ice accretion signal indicates that there is ice accretion present on the surface of the aircraft.

Such an approach can be applied to detect ice accretion that is localized to different regions of the aircraft comprising airfoil surfaces. This differs from a conventional ice accretion sensor that comprises a sensor probe which is typically installed on a forward fuselage of an aircraft and not installed on any other airfoil surface of the aircraft.

In some embodiments, an ice detection system may comprise a plurality of aircraft ice detectors positioned at different locations on a surface of an aircraft, wherein the different aircraft ice detectors can detect ice accretion conditions that are localized to different regions of the aircraft (e.g., fuselage, wing, horizontal stabilizer, vertical stabilizer). Upon detecting an ice accretion condition that is localized to a particular region of the aircraft, the ice detection system can generate control signals operable to activate a corresponding ice protection system that is localized to the region to remove any ice that has accreted in the region. This is also advantageous when icing conditions may include supercooled large drops. Such localized ice accretion detection and mitigation performed by the ice detection system provides the benefit of being more efficient than other conventional approaches that may activate an ice protection system for an entire aircraft based on detecting an ice accretion condition using a conventional aircraft ice detector located at the front of the aircraft.

FIG. 1 shows an example aircraft 100 comprising an ice detection system 102 according to an embodiment of the present disclosure. The ice detection system 102 comprises a plurality of aircraft ice detectors 104A, 104B, 104C, 104D, 104E, 104F, 104G that are positioned at different locations on a surface 106 of the aircraft 100. A first aircraft ice detector 104A is positioned on a nose 108 of the aircraft 100. A second aircraft ice detector 104B is positioned on top of a fuselage 110 of the aircraft 100. A third aircraft ice detector 104C is positioned on a port-side wing 112 of the aircraft 100. A fourth aircraft ice detector 104D is positioned on a strut 115 that connects a nacelle of a starboard-side engine 114 to a starboard-side wing 116 of the aircraft 100. A fifth aircraft ice detector 104E is positioned on the starboard-side wing 116 of the aircraft 100. A sixth aircraft ice detector 104F is positioned on vertical stabilizer 118 of the aircraft 100. A seventh aircraft ice detector 104G is positioned on a horizontal stabilizer 120 of the aircraft 100. In some examples, the aircraft 100 may include additional aircraft ice detectors (not shown) positioned at other locations on the aircraft 100. The aircraft 100 may include any suitable number of aircraft ice detectors.

The plurality of aircraft ice detectors 104A, 104B, 104C, 104D, 104E, 104F, 104G are electrically connected to a computing system 122. Each aircraft ice detector of the plurality of aircraft ice detectors 104A, 104B, 104C, 104D, 104E, 104F, 104G comprises a collection chamber 402 (shown in FIGS. 4-5) forming an aperture 404 (shown in FIGS. 4-5) configured to receive water and/or ice impinging on the surface 106 of the aircraft 100. A baseplate 406 (shown in FIGS. 4-5) is positioned within the collection chamber 402 and configured to collect the water and/or ice that enters through the aperture 404 formed in the collection chamber 402. The collection chamber 402 is structured so that the water and/or ice sits on the baseplate 406. Depth sensors 408A, 408B (shown in FIGS. 4-5) are positioned within the collection chamber 402 and configured to output depth signals 510 (shown in FIG. 5) indicating a depth of the water and/or ice collected on the baseplate 406. A mass sensor 410 (shown in FIGS. 4-5) is configured to output a mass signal 514 (shown in FIG. 5) indicating a mass of the water and/or ice collected on the baseplate 406.

The computing system is configured to, for each aircraft ice detector of the plurality of aircraft ice detectors 104A, 104B, 104C, 104D, 104E, 104F, 104G, receive the depth signals 510 from the depth sensors 408A, 408B, receive the mass signal 514 from the mass sensor 410, calculate a volume of the water and/or ice collected on the baseplate 406 based at least on the depth signals 510 and dimensions of the baseplate 406, and calculate a density 518 of the water and/or ice collected on the baseplate 406 based at least on the mass signal 514 and the calculated volume 516 of the water and/or ice collected on the baseplate 406. The computing system 122 is further configured to output an ice accretion signal 520 (shown in FIG. 5) indicating that there is ice accretion present on the surface of the aircraft at the location of the corresponding aircraft ice detector of the plurality of aircraft ice detectors 104A, 104B, 104C, 104D, 104E, 104F, 104G.

Because each aircraft ice detector of the plurality of aircraft ice detectors 104A, 104B, 104C, 104D, 104E, 104F, 104G is configured to detect localized ice accretion conditions based on measuring a density of water and/or ice collected in the aircraft ice detector, the plurality of aircraft ice detectors 104A, 104B, 104C, 104D, 104E, 104F, 104G can be positioned at different locations across the surface 106 of the aircraft 100. This differs from a conventional ice accretion sensor that comprises a sensor probe that would typically be installed on a forward fuselage of an aircraft and not installed on an airfoil surface of the aircraft.

In some embodiments, the computing system 122 is configured to output the ice accretion signal 520 to a flight deck control interface (not shown) in a cockpit 124 of the aircraft 100 to alert a pilot of the icing condition at the particular location on the aircraft 100. That way, the pilot may be informed of the icing condition and can make suitable adjustments to flight of the aircraft 100 and/or manually activate an ice protection system 526 (shown in FIG. 5) at the location of the icing condition to remove any ice accretion that has formed at the location on the aircraft 100. In some embodiments, the computing system 122 is configured to generate control signals operable to automatically activate the ice protection system 526 at the location of the icing condition based at least on the computing system 122 outputting the ice accretion signal 520. Such localized ice accretion detection and mitigation performed by the ice detection system 102 provides the benefit of being more efficient than other conventional approaches that may activate an ice protection system for an entire aircraft based on detection of an ice accretion condition using a conventional aircraft ice detector. In the illustrated embodiment, the ice detection system 102 is installed on a commercial transport-category aircraft. In other embodiments, the ice detection system 102 can be installed on other types of aircraft to detect ice accretion conditions.

Figure 2:
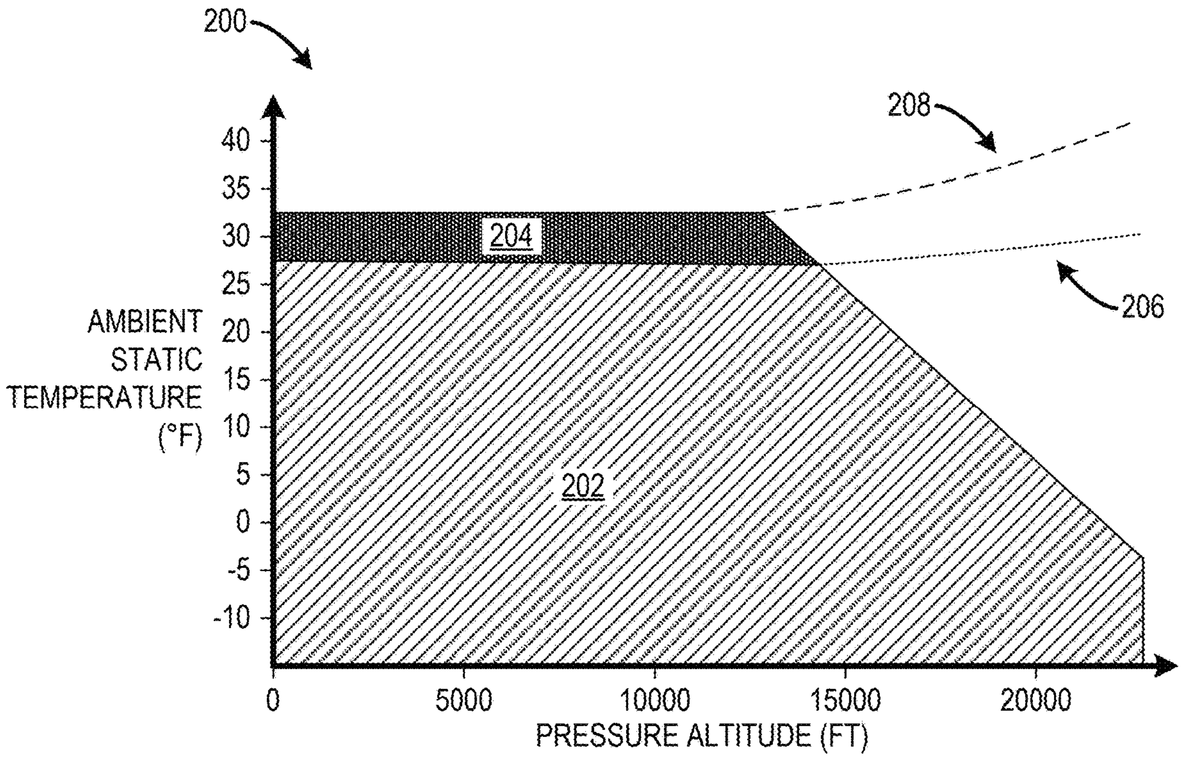
FIG. 2 shows a graph indicating different icing conditions that are detectable by an aircraft ice detector of the present disclosure.

FIG. 2 shows a graph 200 indicating different icing conditions that are detectable in real time by an aircraft ice detector of the present disclosure, such as any of the plurality of aircraft ice detectors 104A, 104B, 104C, 104D, 104E, 104F, 104G shown in FIG. 1. More particularly, such an aircraft ice detector is capable of detecting ice accretion conditions in real time on transport-category commercial aircraft at all temperatures and conditions within the current Federal Aviation Administration (FAA) icing regulations, i.e., the 14 CFR Part 25, Appendix C and Appendix O icing envelopes. The Appendix C icing conditions include continuous maximum (CM) icing conditions where ice can form on a surface of an aircraft. In the graph 200, the Appendix CCM icing conditions are defined by an envelope 202 of an ambient temperature within a range from ~28° F. to −10° F. (and colder) and a pressure altitude within a range of OFT to ~25,000 FT. During Appendix C icing conditions within the envelope 202, ice can form on a probe of a conventional ice accretion sensor. If the ambient temperature rises above the line 206 for a given pressure altitude, the conventional ice accretion sensor may no longer detect icing conditions in a timely manner, even though ice may accrete on a localized aircraft surface.

During Appendix O icing conditions, also known as supercooled large drop (SLD) icing conditions, ice can accrete farther aft on airfoil surfaces of the aircraft 100 beyond where the probe of the conventional ice accretion sensor is located on the forward fuselage. More particularly, when the aircraft 100 is flying in conditions where the ambient temperature is just below freezing (e.g., ~28° F.-~32° F.), ice can accrete on airfoil surfaces of the aircraft 100 (e.g., the leading edge of a wing) prior to ice forming on the sensor probe of the conventional ice accretion sensor at the front of the aircraft. Therefore, the conventional ice accretion sensor is not capable of detecting ice accretion in a timely manner during such conditions. This region 204 in the graph 200 is referred to as a zone of non-detection (ZND).

The reason for the ZND phenomenon of ice forming on the leading edge of a wing or other similar airfoil surface prior to ice formation on the probe of the conventional ice accretion sensor is due to fluid flow characteristics at the wing leading edge versus the forward fuselage area where the conventional ice accretion sensor probe is typically located. The cambered shape of the aircraft wing causes the freestream air to move faster over the top of the wing than the bottom. In turn, this difference in fluid flow velocity causes a pressure differential over the top and bottom the wing. Pressure is inversely proportional to the fluid flow velocity, hence as fluid flow increases in velocity over the top surface of the wing, fluid flow pressure will decrease over the top surface of the wing, generating lift. This pressure differential also leads to a temperature differential over the top and bottom surfaces of the wing. In fluid mechanics, temperature is directly proportional to pressure, therefore, as pressure decreases over the top surface of the wing, temperature will also decrease over the top surface of the wing. This temperature depression over the top surface of the aircraft wing, caused by airfoil camber, is the reason that ice can form on the wing leading edge prior to ice forming on the probe of the conventional ice accretion sensor positioned at the forward fuselage.

Because the aircraft ice detector of the present disclosure does not require a probe and instead employs a collection chamber to collect water and/or ice for ice detection purposes, the aircraft ice detectors can be positioned at any suitable location where ice can accrete on the aircraft 100. This enables the aircraft ice detector to detect ice accretion while the aircraft 100 is flying in the ZND region 204 as shown in the graph 200. Note that when the temperature rises above the line 208 for a given pressure altitude, ice no longer accretes on the airfoil surface 106 of the aircraft 100.

During Appendix O icing conditions, also known as supercooled large drop (SLD) icing conditions, ice can accrete farther aft on airfoil surfaces of the aircraft 100 than typical Appendix C icing conditions. An aircraft ice detector, such as the plurality of aircraft ice detectors 104A, 104B, 104C, 104D, 104E, 104F, 104G, can be positioned at any suitable location on a surface of the aircraft 100 in order to detect Appendix C and Appendix O icing conditions. Moreover, by positioning multiple aircraft ice detectors at different locations on the aircraft 100, the aircraft ice detectors can collectively detect and differentiate between the Appendix O and Appendix C icing conditions, and the aircraft ice detection system 102 can take appropriate action to mitigate any ice accretion that occurs due to such icing conditions. For example, the aircraft ice detection system 102 may be configured to activated different localized ice protection systems depending on the type of icing conditions that are detected.

Figure 3:
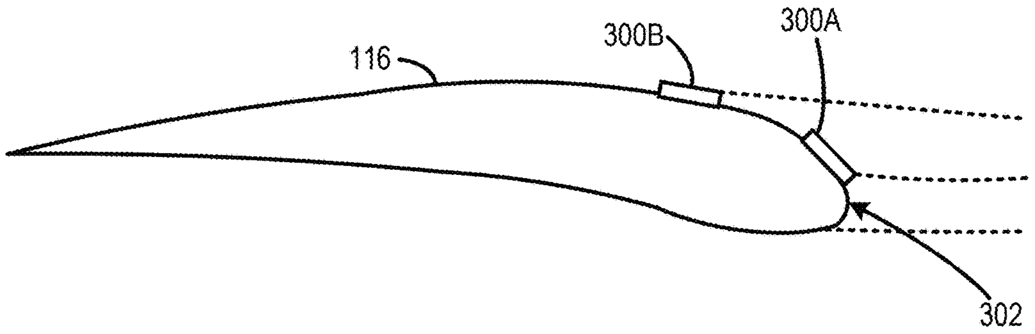
FIG. 3 shows example locations of aircraft ice detectors on an airfoil surface of the aircraft shown in FIG. 1.

Such aircraft ice detectors can be installed on a leading edge of an airfoil surface with or without a leading-edge device, such as slats or flaps in order to detect different types of icing conditions. FIG. 3 shows example locations of first and second aircraft ice detectors 300A and 300B on the surface 106 of the aircraft 100 shown in FIG. 1. In the illustrated example, the first and second aircraft ice detectors 300A and 300B are positioned on the starboard-side wing 116 of the aircraft 100. Specifically, the aircraft ice detectors 300A and 300B are located near a leading edge 302 of the starboard-side wing 116 where ice would be expected to accrete. The first aircraft ice detector 300A is positioned forward on the leading edge 302 of the wing 116 where typical icing conditions of Appendix C would be expected.

The second aircraft ice detector 300B is positioned farther aft on the airfoil surface of the wing 116. The second aircraft ice detector 300B can be used to differentiate between Appendix C and Appendix O icing conditions. More particularly, during Appendix O icing conditions, the second aircraft ice detector 300B may detect ice accretion in addition to the first aircraft ice detector 300A detecting ice accretion due to the difference in airflow along the surface of the wing 116. Moreover, positioning multiple aircraft ice detectors on the wing 116 allows for sensor redundancy in case failure of any one sensor occurs. The aircraft ice detectors 300A and 300B may protrude nominally from the surface of the wing 116 to allow for water and/or ice to be collected in the aircraft ice detectors 300A and 300B. However, the placement of the aircraft ice detectors 300A and 300B on the wing may marginally affect drag across the surface of the wing 116. Note that one or more aircraft ice detectors of the present disclosure can be distributed across different regions of an airfoil surface of an aircraft where ice would likely accrete.

Figure 4:
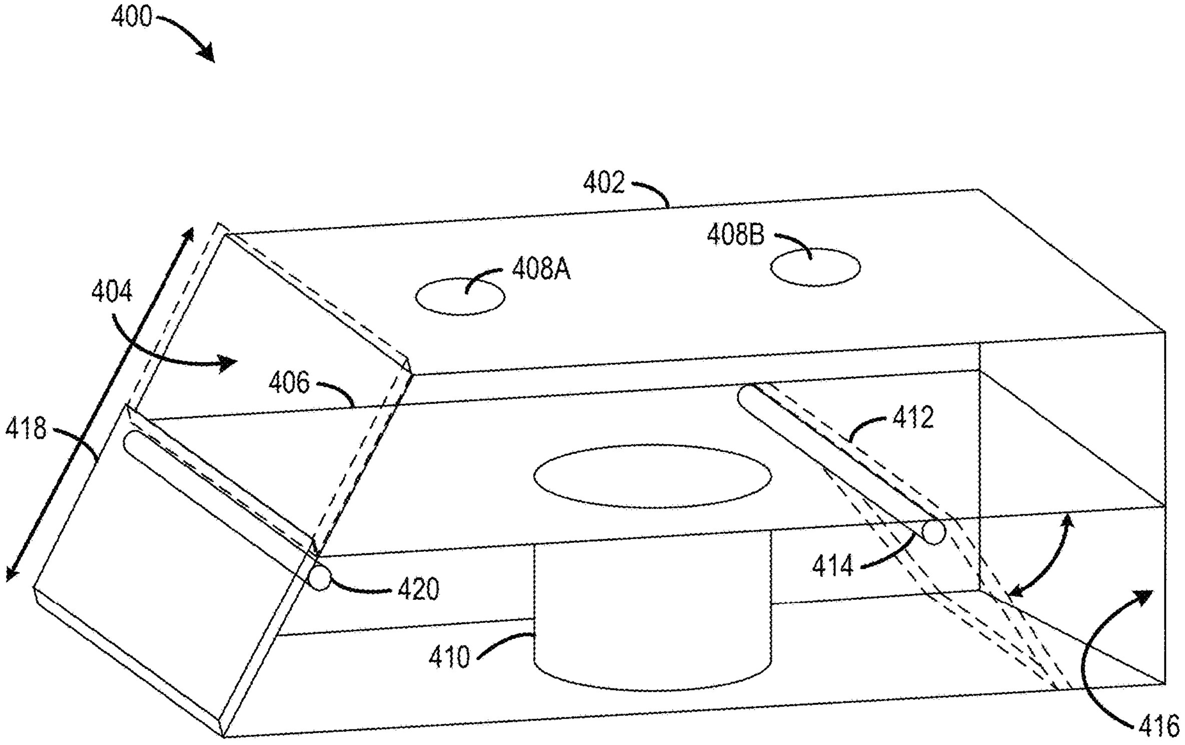
FIG. 4 schematically shows an example aircraft ice detector according to an embodiment of the present disclosure.

FIG. 4 schematically shows an example aircraft ice detector 400 according to an embodiment of the present disclosure. For example, the aircraft ice detector 400 may be representative of any of the plurality of aircraft ice detectors 104A, 104B, 104C, 104D, 104E, 104F, 104G shown in FIG. 1 and the first and second aircraft ice detectors 300A and 300B shown in FIG. 3. The aircraft ice detector 400 comprises a collection chamber 402 that is positioned on a surface of an aircraft, such as the aircraft 100 shown in FIG. 1. The collection chamber 402 forms an aperture 404 that is configured to receive water and/or ice impinging on the surface 106 of the aircraft 100. The aircraft ice detector 400 is arranged on the surface 106 of the aircraft 100, such that the aperture 404 faces forward in the direction of flight of the aircraft 100. The forward flight of the aircraft 100 causes the water and/or ice to flow through the aperture 404 and be collected in the collection chamber 402. The water and/or ice may directly impinge inside the collection chamber 402 or the water and/or ice may run back from an airfoil leading edge surface into the collection chamber 402. In one example, the aperture 404 is 3 inches wide by 1 inch high with sharp edges (preferable to edges with a significant radius so ice does not accrete on the edges). In other examples, the aperture 404 has different dimensions.

A forward edge of the collection chamber 402 that forms the aperture 404 may be flat, angled, or curved in such a geometrical pattern so as to be flush with any curvature of the airfoil leading-edge surface shape at which the aircraft ice detector 400 is positioned. In some examples, a forward edge of an upper surface of the collection chamber 402 is slightly farther aft than a lower surface of the collection chamber 402 and a height of the upper surface of the collection chamber 402 relative to the lower surface is minimized in order to reduce excrescence drag of the aircraft ice detector on the airfoil surface.

The aircraft ice detector 400 comprises a baseplate 406 positioned within the collection chamber 402 and configured to collect the water and/or ice that enters through the aperture 404 and is formed in the collection chamber 402. In some examples, the baseplate 406 comprises a gasket (not shown) arranged around the perimeter of the baseplate 406 to seal moisture from leaking/penetrating down beneath the baseplate 406. The gasket may comprise, for example but not limited to, silicon rubber.

One or more depth sensors are positioned within the collection chamber 402 and configured to output a depth signal indicating a depth of the water and/or ice collected on the baseplate 406. In one example, the one or more depth sensors are attached to an interior ceiling of the collection chamber 402 and pointed straight down at the baseplate 406. In some embodiments, the depth sensor(s) comprise a laser-based depth sensor (e.g., an infrared laser). In other embodiments, the depth sensor(s) comprise a different type of depth sensor.

In the illustrated embodiment, the aircraft ice detector 400 comprises first and second depth sensors 408A and 408B. The first and second depth sensors 408A and 408B are spaced apart from each other on the interior ceiling of the collection chamber 402. The first depth sensor 408A is configured to output a first depth signal indicating a depth of the water and/or ice collected on the baseplate 406 and the second depth sensor 408B is configured to output a second depth signal indicating a depth of the water and/or ice collected on the baseplate 406. The first and second depth signals may be averaged together to calculate an average water/ice depth since the surface of the water and/or ice may not be completely smooth or level on the baseplate 406. Additionally, the multiple depth sensors 408A and 408B provide redundancy in case one of the depth sensors malfunctions. The aircraft ice detector 400 may comprise any suitable number of depth sensors to measure the depth of the water and/or ice collected on the baseplate 406.

The aircraft ice detector 400 comprises a mass sensor 410 configured to output a mass signal indicating a mass of the water and/or ice collected on the baseplate 406. In one embodiment, the mass sensor 410 comprises a load cell that is located beneath the baseplate 406 and is configured to measure the mass of the water and/or ice collected on the baseplate 406 as it increases due to water and/or ice impingement/accretion on the baseplate 406. In other embodiments, the mass sensor 410 comprises a different type of mass sensor. The mass sensor 410 may be configured to continually measure the downward force on the baseplate 406 in real time. The measurement may be zeroed out to neglect the tare weight of the baseplate 406 itself so that differential mass measurements will determine the mass of water and/or ice on the baseplate 406.

The aircraft ice detector 400 comprises an exit door 412 formed in the collection chamber 402. The exit door 412 is actuatable between a closed position and an open position. The exit door 412 is placed in the closed position while the water and/or ice is collected onto the baseplate 406. The exit door 412 transitions to the open position to allow the water to exit the collection chamber 402 once depth and mass measurements have been performed by the depth sensors 408A, 408B and the mass sensor 410, respectively. In the illustrated embodiment, the exit door 412 is positioned at the aft end of the baseplate 406. The exit door 412 is a hinged “trap door” that is actuated by a motorized hinge 414 to drain the water from the baseplate 406 and out through an exit aperture 416 formed at the aft end of the aircraft ice detector 400.

The aircraft ice detector 400 comprises a shield door 418 that is operable to transition between an open position and a closed position on a front end of the collection chamber 402. In the open position, the shield door 418 allows the water and/or ice to accumulate in the collection chamber 402. In the closed position, the shield door 418 at least partially blocks the aperture 404 and allows for the water and/or ice accumulated in the collection chamber 402 to be undisturbed by air flow through the aperture 404 while the depth of the water and/or ice is measured by the depth sensors 408A, 408B and the mass of the water and/or ice is measured by the mass sensor 410. In the illustrated embodiment, the shield door 418 is actuated by a geared motor 420 to slide up and at least partially block the airflow into the collection chamber 402, and then be retracted back into its original position at specified time intervals.

Figure 5:
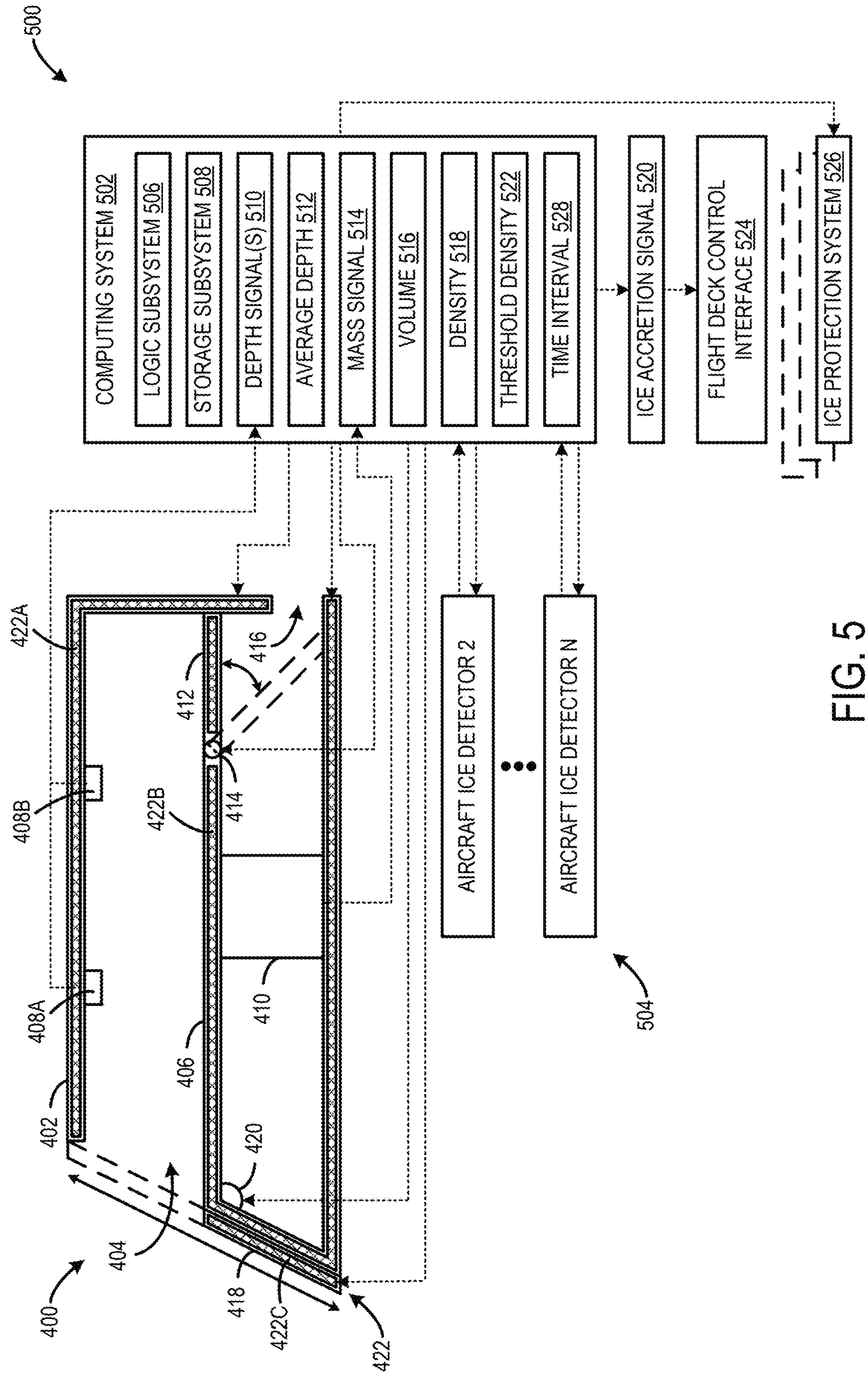
FIG. 5 schematically shows an example ice detection system comprising the aircraft ice detector of FIG. 4.

The aircraft ice detector 400 comprises a heating system 422 (shown in FIG. 5). The heating system 422 is configured to heat various components of the aircraft ice detector 400 to remove any ice that accretes on the aircraft ice detector 400 during different phases of operation. In some embodiments, the heating system 422 comprises a plurality of heating coils embedded in different surfaces of the aircraft ice detector 400. As shown in FIG. 5, in the illustrated embodiment, the heating system 422 comprises a first heating element 422A embedded in the outer surface of the collection chamber 402, a second heating element 422B embedded in the baseplate 406 and the exit door 412, and a third heating element 422C embedded in the shield door 418.

The first heating element 422A can be activated periodically to remove any ice that accretes on the outer surface of the aircraft ice detector 400. Further, the first heating element 422A can be activated to prevent the depth sensors 408A, 408B from freezing. The second heating element 422B can be activated at the end of an ice detection cycle after the mass sensor 410 and the depth sensors 408A, 408B have taken measurement of the water and/or ice that has collected on the baseplate 406. The second heating element 422B is activated to ensure that the collected water and/or ice turns to water, such that the water can flow through the open exit door 412 and out of the exit aperture 416. Further, the second heating element 422B can be activated to prevent the mass sensor 410 from freezing. The third heating element 422C is activated before the shield door 418 is transitioned between open and closed positions to remove any ice that accretes on the surface of the shield door to allow for the shield door to move smoothly between the open and closed positions.

The various components of the aircraft ice detector 400 may be constructed of non-corrosive materials, such as but not limited to, stainless steel since they would be exposed to ambient moisture conditions. In some embodiments, the aircraft ice detector 400 can be painted with non-corrosive paint that withstands conditions in which ice accretes.

FIG. 5 schematically shows an ice detection system 500 comprising the aircraft ice detector 400 of FIG. 4. The ice detection system 500 comprises a computing system 502 that is configured to control operation of the aircraft ice detector 400. In the illustrated embodiment, the aircraft ice detector 400 is one of a plurality of aircraft ice detectors 504 (e.g., aircraft ice detector 400 and aircraft ice detectors 2-N) that is electrically connected to the computing system 502 and controlled by the computing system 502. The plurality of aircraft ice detectors 504 may be positioned at different locations on an airfoil surface of an aircraft. For example, the plurality of aircraft ice detectors 504 may be representative of the plurality of aircraft ice detectors 104A, 104B, 104C, 104D, 104E, 104F, 104G shown in FIG. 1 and the computing system 502 may be representative of the computing system 122 shown in FIG. 1.

In other embodiments, each aircraft ice detector of the plurality of aircraft ice detectors 504 may be controlled by a plurality of computing systems corresponding to the plurality of aircraft ice detectors 504 in a distributed arrangement. In some such embodiments, the plurality of computing systems may be in communication with a central computing system that is configured to control operation of the plurality of aircraft ice detectors 504 in a coordinated manner.

The computing system 502 comprises a logic subsystem 506 and a storage subsystem 508 holding instructions executable by the logic subsystem 506 to perform various computing operations that control operation of the plurality of aircraft ice detectors 504. Control of the aircraft ice detector 400 via the computing system 502 will now be described herein. The storage subsystem 508 holds instructions executable by the logic subsystem 506 to receive depth signals 510 from the depth sensors 408A, 408B, and calculate an average depth 512 of the water and/or ice collected on the baseplate 406 based at least on the depth signals 510. Further, the storage subsystem 508 holds instructions executable by the logic subsystem 506 to receive a mass signal 514 from the mass sensor 410, calculate a volume 516 of the water and/or ice collected on the baseplate 406 based at least on the average depth 512 and dimensions of the baseplate 406, and calculate a density 518 of the water and/or ice collected on the baseplate 406 based at least on the mass signal 514 and the calculated volume 516 of the water and/or ice collected on the baseplate 406. The storage subsystem 508 holds instructions executable by the logic subsystem 506 to output an ice accretion signal 520 indicating that there is ice accretion present on the surface of the aircraft 100 based at least on the calculated density 518 of the water and/or ice collected on the baseplate 406 being less than a threshold density 522. Water has a typical density of 64 lb/gal, whereas ice has a density ranging from approximately 50 lb/gal for rime ice to 58 lb/gal for glaze ice. In one example, the density threshold 522 is set to 58 lb/gal. In other examples, the density threshold 522 may be set to a different density value that differentiates between the density of water and the density of ice.

In some embodiments, the computing system 502 is configured to output the ice accretion signal 520 to a flight deck control interface 524 in a cockpit of the aircraft to alert a pilot of the icing condition at the particular location on the aircraft 100 where the aircraft ice detector 400 is located. That way, the pilot may be informed of the icing condition and can make suitable adjustments to flight of the aircraft and/or manually activate an ice protection system 526 at the location of the icing condition to remove any ice accretion that has formed at the location. The ice protection system 526 comprises system components such as, but not limited to, heaters embedded in the airfoil surfaces of the aircraft that heat the surface to remove any ice accretion formed on the airfoil surface.

In some embodiments, the computing system 502 is configured to generate control signals operable to automatically activate the ice protection system 526 at the location of the icing condition based at least on the computing system 502 outputting the ice accretion signal 520.

Such localized ice accretion detection and mitigation performed by the ice detection system 500 provides the benefit of being more efficient than other conventional approaches that may activate an ice protection system for an entire aircraft based on detection an ice accretion condition using a conventional aircraft ice detector. The computing system 502 is configured to control each of the plurality of aircraft ice detectors 504 in the same manner as described above.

In some embodiments, the ice detection system 500 is configured to control each of the plurality of aircraft ice detectors 504 to repeatedly perform an ice detection cycle that comprises calculating the density of water and/or ice collected on the baseplate 406, generating control signals operable to activate the heating system 422 to turn the water and/or ice into water and, and generating control signals operable to open the exit door 412 to flush the water. The ice detection cycle is performed repeatedly by the aircraft ice detector according to a designated time interval 528. The designated time interval 528 may be set to any time interval that is suitable to detect ice accretion under different ambient conditions in a timely manner. In some embodiments, the designated time interval 528 is dynamically set by the computing system 502 based at least on one or more of an altitude of the aircraft and an ambient temperature. For example, the interval may be increased and/or the plurality of aircraft ice detectors 504 may be deactivated when the ambient temperature is above a threshold temperature. By dynamically setting the time interval based at least on operation conditions, the efficiency of the plurality of aircraft ice detectors 504 can be increased, because the plurality of aircraft ice detectors 504 need only operate when conditions are suitable to detect ice accretion.

Figure 6:
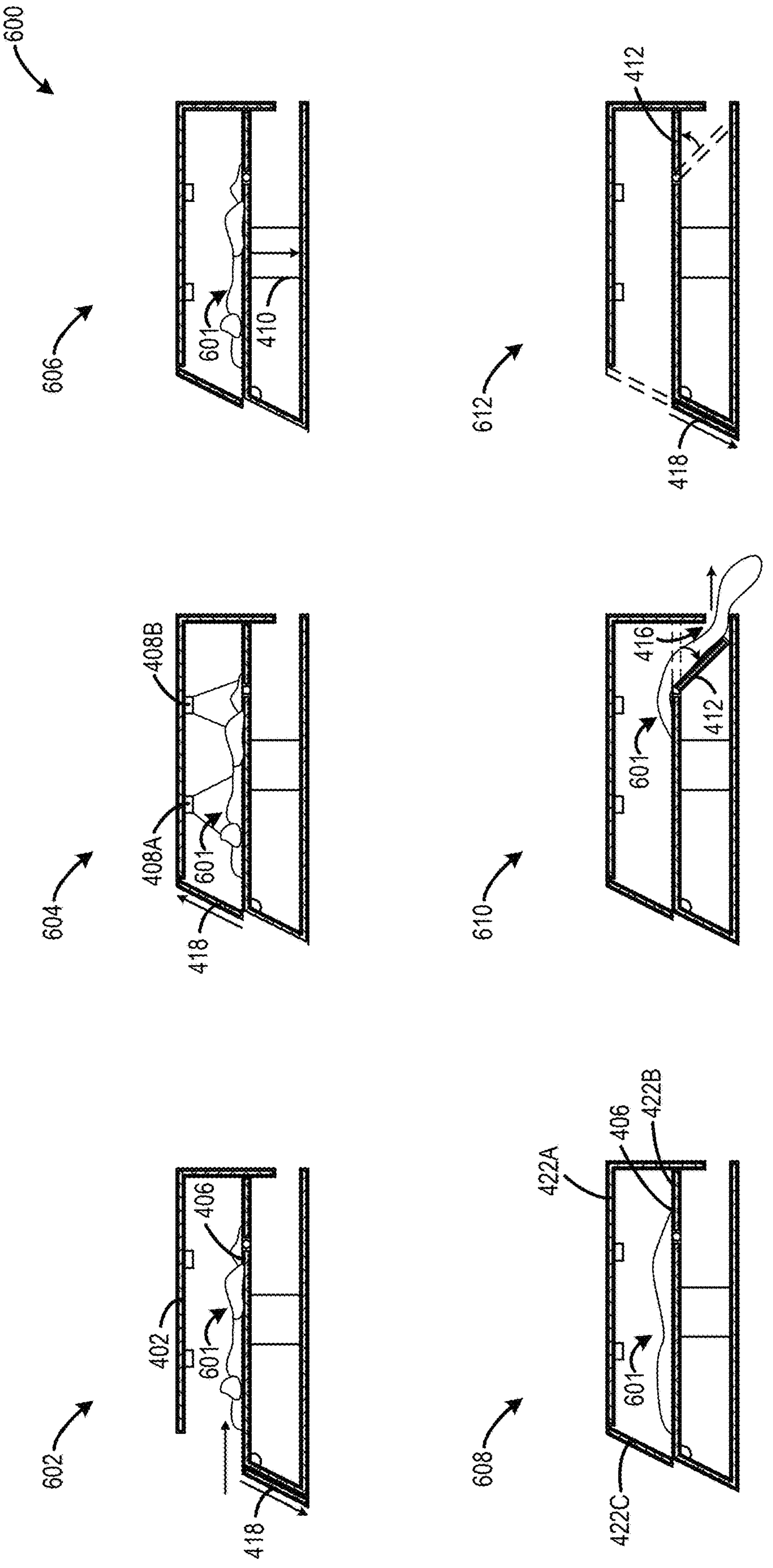
FIG. 6 shows an example sequence of operations of an ice detection cycle performed by the aircraft ice detector of FIG. 4.

FIG. 6 shows an example sequence 600 of operations of an ice detection cycle performed by the aircraft ice detector 400 of FIG. 4. At 602, the shield door 418 is transitioned to an open position to allow water and/or ice 601 to flow into the collection chamber 402 and collect on the baseplate 406. At 604, the shield door 418 is transitioned to a closed position, so that the water and/or ice 601 is not disturbed by airflow into the collection chamber 402 while measurements are being performed on the water and/or ice 601. Further, the depth sensors 408A, 408B output depth signals measuring the depth of the water and/or ice 601. The depth signals may be used to calculate an average depth of the water and/or ice 601. The average depth of the water and/or ice 601 is used to calculate a volume of the water and/or ice 601. At 606, the mass of the water and/or ice 601 is measured by the mass sensor 410. The mass is used to calculate the density of the water and/or ice to determine if the water and/or ice is in fact water or ice. At 608, the heating elements 422A, 422B, 422C of the heating system 422 are activated to remove any ice that has accreted on the aircraft ice detector. In some embodiments, the heating element 422A may remain activated continuously to prevent any ice accretion on the exterior of the aircraft ice detector 400. In some embodiments, the heating element 422A may remain activated continuously while operating below a designated temperature threshold (e.g., 35° F.). If ice is collected on the baseplate 406, activation of the second heating element 422B melts the ice into water. At 610, the exit door 412 is transitioned to an open position to allow the water 601 to be flushed from the aircraft ice detector through the exit aperture 416. At 612, the exit door 412 is transitioned to the closed position and the shield door 418 is transitioned to the open position to reset the aircraft ice detector for the next ice detection cycle. As discussed above, the ice detection cycle may be performed repeatedly according to any suitable time interval.

Figure 7A:
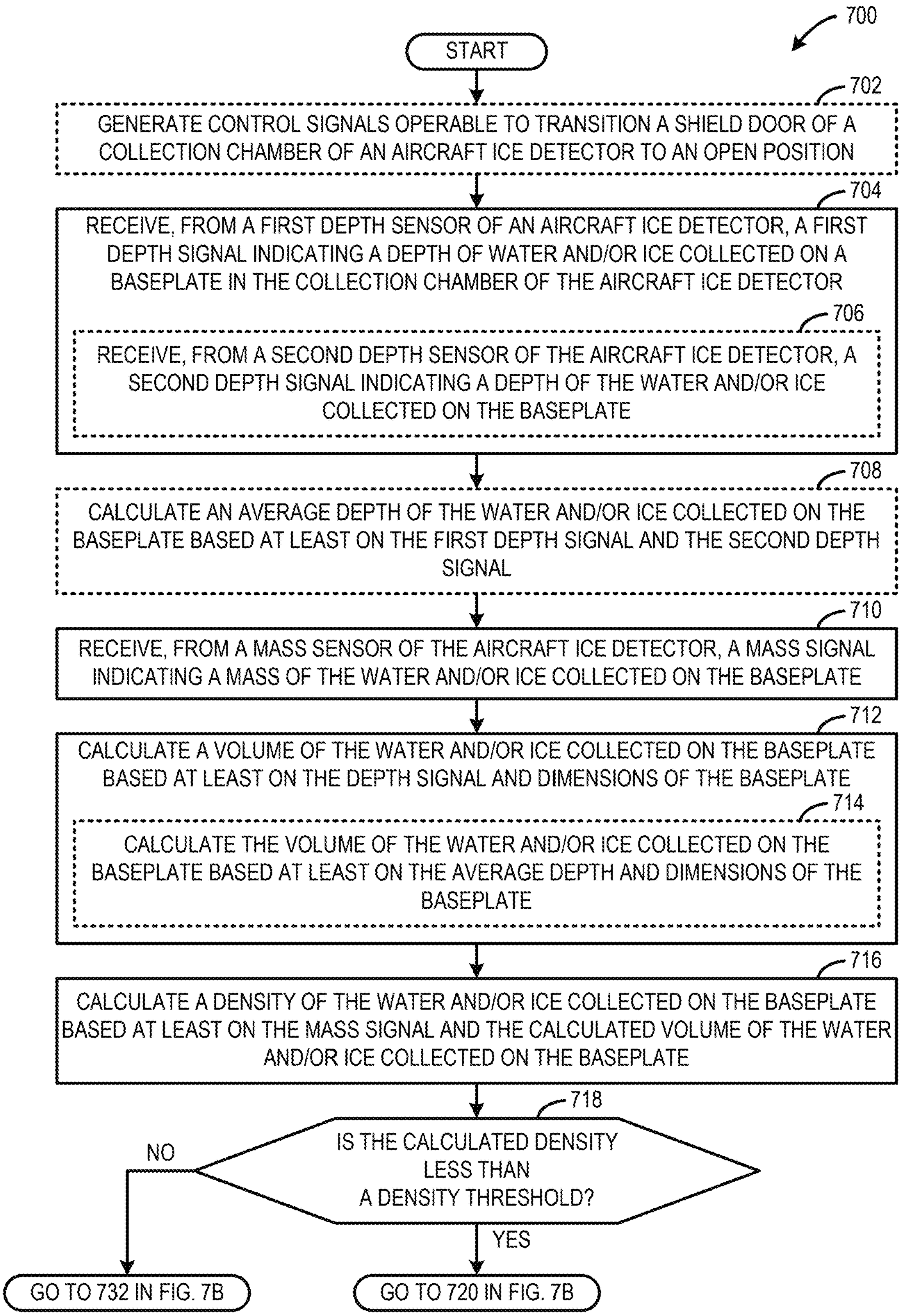
FIGS. 7A-7B shows an example method for controlling an aircraft ice detector.
Figure 7B:
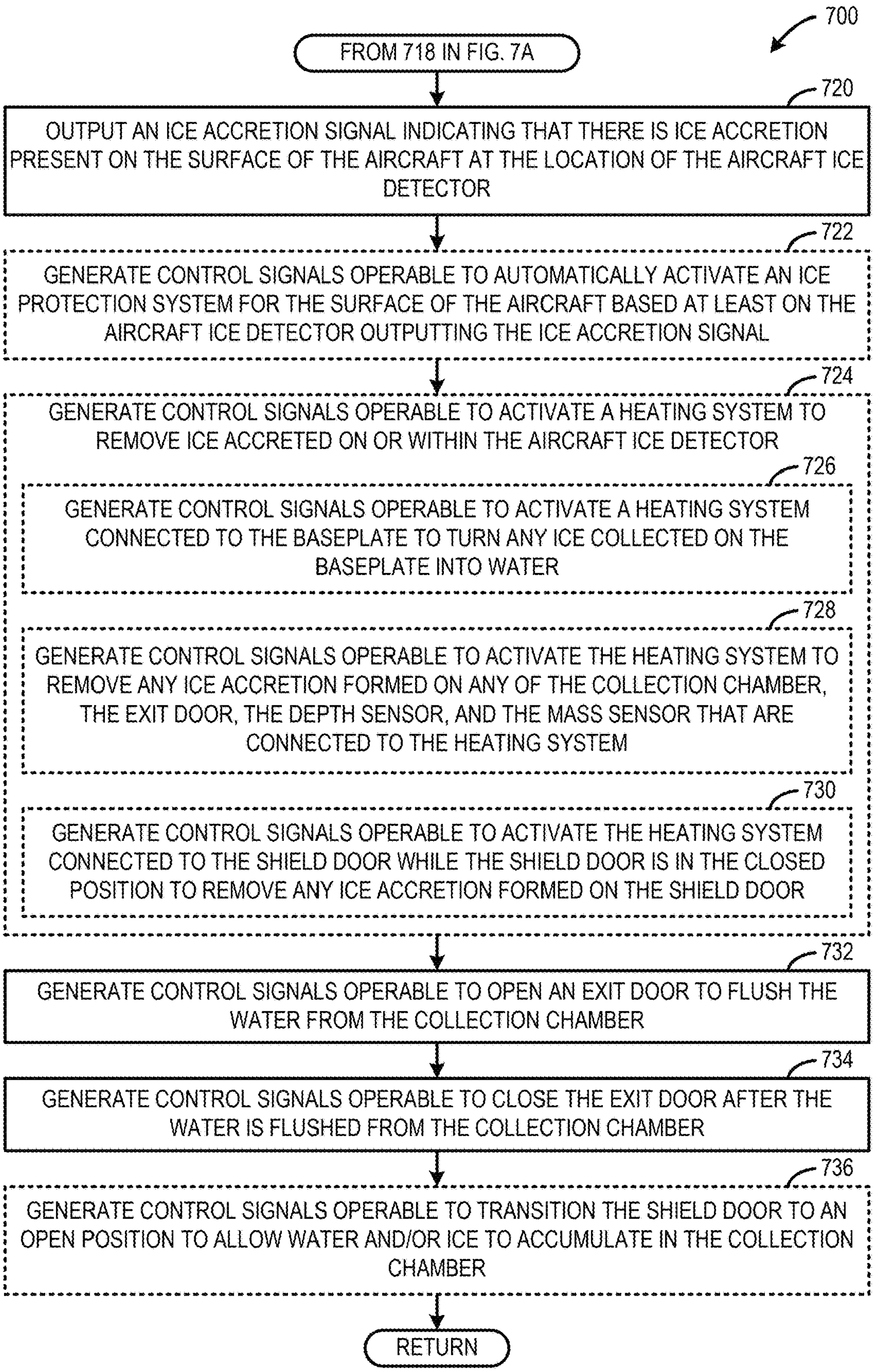

FIGS. 7A-7B shows an example method 700 for controlling an aircraft ice detector. For example, the method 700 may be performed by the computing system 122 in FIG. 1 to control any of the plurality of aircraft ice detectors 104A, 104B, 104C, 104D, 104E, 104F, 104G or the computing system 502 in FIG. 5 to control any of the plurality of aircraft ice detectors 504. Note that method steps indicated in dotted lines optionally may be performed in some embodiments.

In FIG. 7A, in some embodiments where the aircraft ice detector comprises a shield door, at 702, the method 700 may include generating control signals operable to transition the shield door of a collection chamber of the aircraft ice detector to an open position to allow water and/or ice to collect in the collection chamber.

At 704, the method 700 includes receiving, from a first depth sensor of the aircraft ice detector, a first depth signal indicating a depth of water and/or ice collected on a baseplate in the collection chamber of the aircraft ice detector.

In some embodiments where the aircraft ice detector includes a second depth sensor, at 706, the method 700 may include receiving, from the second depth sensor, a second depth signal indication a depth of the water and/or ice collected on the baseplate. In some embodiments, at 708, the method may include calculating an average depth of the water and/or ice collected on the baseplate based at least on the first depth signal and the second depth signal.

At 710, the method 700 includes receiving, from a mass sensor of the aircraft ice detector, a mass signal indicating a mass of the water and/or ice collected on the baseplate.

At 712, the method 700 includes calculating a volume of the water and/or ice collected on the baseplate based at least on the depth signal and dimensions of the baseplate. In some embodiments where the average depth of the water and/or ice is calculated, at 714, the method 700 may include calculating the volume of the water and/or ice collected on the baseplate based at least on the average depth and the dimension of the baseplate.

At 716, the method 700 includes calculating a density of the water and/or ice collected on the baseplate based at least on the mass signal and the calculated volume of the water and/or ice collected on the baseplate.

At 718, the method 700 includes determining if the calculated density is less than a density threshold. The density threshold distinguishes between the density of water and the density of ice. If the density is less than the density threshold, then the method 700 moves to 720 in FIG. 7B. Otherwise, if the density is not less than the density threshold, then the method 700 moves to 732 in FIG. 7B.

In FIG. 7B, at 720, the method 700 includes outputting an ice accretion signal indicating that there is ice accretion present on the surface of the aircraft at the location of the aircraft ice detector. For example, the ice accretion signal may be output to a flight deck control interface in a cockpit of the aircraft to alert a pilot of the icing condition. That way, the pilot can make suitable adjustments to flight of the aircraft and/or manually activate an ice protection system at the location of the icing condition to remove any ice accretion that has formed at the location.

In some embodiments, at 722, the method 700 may include generating control signals operable to automatically activate an ice protection system for the surface of the aircraft based at least on the aircraft ice detector outputting the ice accretion signal. For example, the ice protection system may comprise a localized heating element that is activated to remove ice accretion at the location of the aircraft ice detector.

In some embodiments, at 724, the method 700 may include generating control signals operable to activate the heating system to remove ice accreted on or within the aircraft ice detector. In some embodiments, at 726, the method 700 may include generating control signals operable to activate the heating system connected to the baseplate to turn any ice collected on the baseplate into water. In some embodiments, at 728, the method 700 may include generating control signals operable to activate the heating system to remove any ice accretion formed on any of the collection chamber, an exit door, the depth sensor, and the mass sensor that are connected to the heating system. In some embodiments, at 730, the method 700 may include generating control signals operable to activate the heating system connected to the shield door while the shield door is in the closed position to remove any ice accretion formed on the shield door.

At 732, the method 700 includes generating control signals operable to open the exit door to flush the water from the collection chamber.

At 734, the method 700 includes generating control signals operable to close the exit door after the water is flushed from the collection chamber.

In some embodiments where the aircraft ice detector comprises a shield door, at 736, the method 700 may include generating control signals operable to transition the shield door to an open position to allow water and/or ice to accumulate in the collection chamber.

The method 700 may be performed repeatedly to control an aircraft ice detector to repeatedly perform ice detection cycles according to any suitable time interval. Moreover, the method 700 may be performed for any suitable number of different aircraft ice detectors positioned at different locations on an aircraft. The method 700 leverages the use of a calculated density of collected water and/or ice to detect the presence of ice accretion. Such an approach can be applied to detect ice accretion that is localized to airfoil surfaces. This differs from a conventional ice accretion sensor that comprises a sensor probe which would typically be installed on a forward fuselage of an aircraft and not be installed on an airfoil surface of the aircraft.

The methods and processes described herein can be tied to a computing system of one or more computing devices. In particular, such methods and processes can be implemented as an executable computer-application program, a network-accessible computing service, an application-programming interface (API), a library, or a combination of the above and/or other computing resources.

Figure 8:
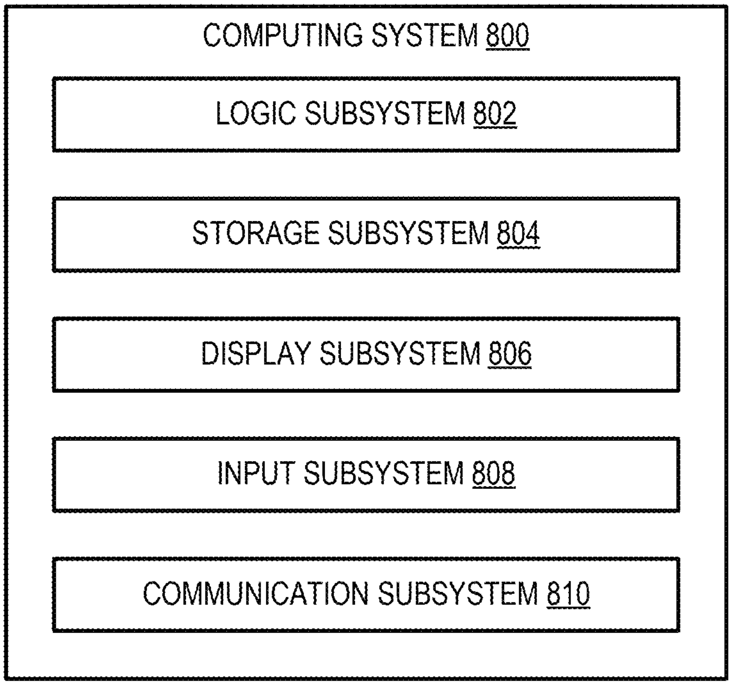
FIG. 8 shows an example computing system.

FIG. 8 schematically shows a simplified representation of a computing system 800 configured to provide any to all of the computing functionality described herein. Computing system 800 can take the form of one or more embedded controllers, personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IOT) devices, embedded computing devices, and/or other computing devices. For example, the computing system 800 can be representative of the computing system 122 shown in FIG. 1 and the computing system 502 shown in FIG. 5.

Computing system 800 includes a logic subsystem 802 and a storage subsystem 804. Computing system 800 can optionally include a display subsystem 806, input subsystem 808, communication subsystem 810, and/or other subsystems not shown in FIG. 8.

Logic subsystem 802 includes one or more physical devices configured to execute instructions. For example, the logic subsystem can be configured to execute instructions that are part of one or more applications, services, or other logical constructs. The logic subsystem can include one or more hardware processors configured to execute software instructions. Additionally, or alternatively, the logic subsystem can include one or more hardware or firmware devices configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices can be collocated and/or remotely located. Storage subsystem 804 can include volatile, nonvolatile, dynamic, static, read/write, read-only, random-access, sequential-access, location-addressable, file-addressable, and/or content-addressable devices. Storage subsystem 804 can include removable and/or built-in devices. When the logic subsystem executes instructions, the state of storage subsystem 804 can be transformed—e.g., to hold different data.

Aspects of logic subsystem 802 and storage subsystem 804 can be integrated together into one or more hardware-logic components. Such hardware-logic components can include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem can cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine can be instantiated by a single computing device, or a machine can include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality can optionally be saved as one or more unexecuted modules on one or more suitable storage devices.

The terms "module," "program," and "engine" can be used to describe an aspect of computing system 800 typically implemented in software by a processor to perform a particular function using portions of volatile memory, which function involves transformative processing that specially configures the processor to perform the function. Thus, a module, program, or engine can be instantiated via the logic subsystem 802 executing instructions held by storage subsystem 804. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

When included, display subsystem 806 can be used to present a visual representation of data held by storage subsystem 804. This visual representation can take the form of a graphical user interface (GUI). Display subsystem 806 can include one or more display devices utilizing virtually any type of technology. In some implementations, display subsystem can include one or more virtual-, augmented-, or mixed reality displays.

When included, input subsystem 808 can comprise or interface with one or more input devices. An input device can include a sensor device or a user input device. Examples of user input devices include a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 can be configured to communicatively couple computing system 800 with one or more other computing devices. Communication subsystem 810 can include wired and/or wireless communication devices compatible with one or more different communication protocols. The communication subsystem can be configured for communication via personal-, local- and/or wide-area networks.

In an example, an aircraft ice detector comprises a collection chamber positioned on a surface of an aircraft, wherein the collection chamber forms an aperture configured to receive water and/or ice impinging on the surface of the aircraft, a baseplate positioned within the collection chamber and configured to collect the water and/or ice that enters through the aperture formed in the collection chamber, a depth sensor positioned within the collection chamber and configured to output a depth signal indicating a depth of the water and/or ice collected on the baseplate, a mass sensor configured to output a mass signal indicating a mass of the water and/or ice collected on the baseplate, and a computing system comprising a logic subsystem, and a storage subsystem holding instructions executable by the logic subsystem to receive the depth signal from the depth sensor, receive the mass signal from the mass sensor, calculate a volume of the water and/or ice collected on the baseplate based at least on the depth signal and dimensions of the baseplate, calculate a density of the water and/or ice collected on the baseplate based at least on the mass signal and the calculated volume of the water and/or ice collected on the baseplate, and based at least on the calculated density of the water and/or ice collected on the baseplate being less than a threshold density, output an ice accretion signal indicating that there is ice accretion present on the surface of the aircraft at a location of the aircraft ice detector. In this example and/or other examples, the depth sensor may be a first depth sensor, the depth signal may be a first depth signal, the aircraft ice detector may further comprise a second depth sensor positioned within the collection chamber and spaced apart from the first depth sensor, the second depth sensor may be configured output a second depth signal indicating a depth of the water and/or ice collected on the baseplate, and the storage subsystem may hold instructions executable by the logic subsystem to receive the second depth signal from the second depth sensor, calculate an average depth of the water and/or ice collected on the baseplate based at least on the first depth signal and the second depth signal, and calculate the volume of the water and/or ice collected on the baseplate based at least on the average depth and the dimensions of the baseplate. In this example and/or other examples, the aircraft ice detector may further comprise a heating system connected to the baseplate, an exit door formed in the collection chamber, and the storage subsystem may hold instructions executable by the logic subsystem to after calculating the density of the water and/or ice collected on the baseplate, generate control signals operable to activate the heating system to turn any ice collected on the baseplate into water, open an exit door to flush the water from the collection chamber; and close the exit door after the water is flushed from the collection chamber. In this example and/or other examples, the heating system may be further connected to one or more of the collection chamber, the exit door, the depth sensor, and the mass sensor; and the storage subsystem may hold instructions executable by the logic subsystem to generate control signals operable to periodically activate the heating system to remove any ice accretion formed on any of the collection chamber, the exit door, the depth sensor, and the mass sensor that are connected to the heating system. In this example and/or other examples, an ice detection cycle comprising calculating the density of water and/or ice collected on the baseplate, generating control signals operable to activate the heating system to turn the water and/or ice into water, and generating control signals operable to open the exit door to flush the water may be performed repeatedly by the aircraft ice detector according to a designated time interval. In this example and/or other examples, the designated time interval may be dynamically set based at least on one or more of an altitude of the aircraft and an ambient temperature. In this example and/or other examples, the aircraft ice detector may further comprise a shield door operable to transition between an open position and a closed position, the storage subsystem may hold instructions executable by the logic subsystem to generate control signals operable to transition the shield door to the open position to allow the water and/or ice to accumulate in the collection chamber, and generate control signals operable to transition the shield door to the closed position that at least partially blocks the aperture and allows for the water and/or ice accumulated in the collection chamber to be undisturbed by air flow through the aperture while the depth of the water and/or ice is measured by the depth sensor and the mass of the water and/or ice is measured by the mass sensor. In this example and/or other examples, the aircraft ice detector may further comprise a heating system connected to the shield door, the storage subsystem may hold instructions executable by the logic subsystem to generate control signals operable to activate the heating system while the shield door is in the closed position to remove any ice accretion formed on the shield door, and after activating the heater, generate control signals operable to transition the shield door back to the open position. In this example and/or other examples, the ice accretion signal may be output to a flight deck control interface of the aircraft. In this example and/or other examples, the storage subsystem may hold instructions executable by the logic subsystem to generate control signals operable to activate an ice protection system for the surface of the aircraft based at least on the aircraft ice detector outputting the ice accretion signal.

In another example a computer-implemented method for controlling an aircraft ice detector comprises receiving, from a depth sensor of the aircraft ice detector, a depth signal indicating a depth of water and/or ice collected on a baseplate in a collection chamber of the aircraft ice detector, receiving, from a mass sensor of the aircraft ice detector, a mass signal indicating a mass of the water and/or ice collected on the baseplate, calculating a volume of the water and/or ice collected on the baseplate based at least on the depth signal and dimensions of the baseplate, calculating a density of the water and/or ice collected on the baseplate based at least on the mass signal and the calculated volume of the water and/or ice collected on the baseplate, and based at least on the calculated density of the water and/or ice collected on the baseplate being less than a threshold density, outputting an ice accretion signal indicating that there is ice accretion present on the surface of the aircraft at a location of the aircraft ice detector. In this example and/or other examples, the depth sensor may be a first depth sensor, the depth signal may be a first depth signal, the aircraft ice detector may further comprise a second depth sensor positioned within the collection chamber and spaced apart from the first depth sensor, and the computer-implemented method further comprise receiving the second depth signal from the second depth sensor, calculating an average depth of the water and/or ice collected on the baseplate based at least on the first depth signal and the second depth signal, and calculating the volume of the water and/or ice collected on the baseplate based at least on the average depth and the dimensions of the baseplate. In this example and/or other examples, the computer-implemented method may further comprise after calculating the density of the water and/or ice collected on the baseplate, generating control signals operable to activate a heating system connected to the baseplate to turn any ice collected on the baseplate into water, open an exit door to flush the water from the collection chamber, and close the exit door after the water is flushed from the collection chamber. In this example and/or other examples, the heating system may be further connected to one or more of the collection chamber, the exit door, the depth sensor, and the mass sensor, and the computer-implemented method further comprise generating control signals operable to activate the heating system to remove any ice accretion formed on any of the collection chamber, the exit door, the depth sensor, and the mass sensor that are connected to the heating system. In this example and/or other examples, the computer-implemented method may further comprise generating control signals operable to transition a shield door of the aircraft ice detector to an open position to allow water and/or ice to accumulate in the collection chamber, and generating control signals operable to transition the shield door to a closed position that at least partially blocks the aperture and allows for the water and/or ice accumulated in the collection chamber to be undisturbed by air flow through the aperture while the depth of the water and/or ice is measured by the depth sensor and the mass of the water and/or ice is measured by the mass sensor. In this example and/or other examples, the computer-implemented method may further comprise generating control signals operable to activate a heating system connected to the shield door while the shield door is in the closed position to remove any ice accretion formed on the shield door, and after activating the heater, generating control signals operable to transition the shield door back to the open position. In this example and/or other examples, the computer-implemented method may further comprise generating control signals operable to activate an ice protection system for the surface of the aircraft based at least on the aircraft ice detector outputting the ice accretion signal.

In another example, an ice detection system for an aircraft comprises a plurality of aircraft ice detectors positioned at different locations on a surface of an aircraft, wherein each aircraft ice detector comprises a collection chamber forming an aperture configured to receive water and/or ice impinging on the surface of the aircraft, a baseplate positioned within the collection chamber and configured to collect the water and/or ice that enters through the aperture formed in the collection chamber, a depth sensor positioned within the collection chamber and configured to output a depth signal indicating a depth of the water and/or ice collected on the baseplate, and a mass sensor configured to output a mass signal indicating a mass of the water and/or ice collected on the baseplate, and a computing system comprising a logic subsystem, and a storage subsystem holding instructions executable by the logic subsystem to for each aircraft ice detector of the plurality aircraft ice detectors, receive the depth signal from the depth sensor, receive the mass signal from the mass sensor, calculate a volume of the water and/or ice collected on the baseplate based at least on the depth signal and dimensions of the baseplate, calculate a density of the water and/or ice collected on the baseplate based at least on the mass signal and the calculated volume of the water and/or ice collected on the baseplate, and based at least on the calculated density of the water and/or ice collected on the baseplate being less than a threshold density, output an ice accretion signal indicating that there is ice accretion present on the surface of the aircraft at a location of the corresponding aircraft ice detector. In this example and/or other examples, for each aircraft ice detector of the plurality aircraft ice detectors, the ice accretion signal may be output to a flight deck control interface of the aircraft. In this example and/or other examples, the storage subsystem may hold instructions executable by the logic subsystem to generate control signals operable to activate an ice protection system associated with the corresponding aircraft ice detector based at least on the computing system outputting the ice accretion signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An aircraft ice detector, comprising:
- a collection chamber positioned on a surface of an aircraft, wherein the collection chamber forms an aperture configured to receive water and/or ice impinging on the surface of the aircraft;
- a baseplate positioned within the collection chamber and configured to collect the water and/or ice that enters through the aperture formed in the collection chamber;
- a depth sensor positioned within the collection chamber and configured to output a depth signal indicating a depth of the water and/or ice collected on the baseplate;
- a mass sensor configured to output a mass signal indicating a mass of the water and/or ice collected on the baseplate; and
- a computing system comprising:
  - a logic subsystem; and
  - a storage subsystem holding instructions executable by the logic subsystem to:
    - receive the depth signal from the depth sensor;
    - receive the mass signal from the mass sensor;
    - calculate a volume of the water and/or ice collected on the baseplate based at least on the depth signal and dimensions of the baseplate;
    - calculate a density of the water and/or ice collected on the baseplate based at least on the mass signal and the calculated volume of the water and/or ice collected on the baseplate; and
    - based at least on the calculated density of the water and/or ice collected on the baseplate being less than a threshold density, output an ice accretion signal indicating that there is ice accretion present on the surface of the aircraft at a location of the aircraft ice detector.

2. The aircraft ice detector of claim 1, wherein the depth sensor is a first depth sensor, wherein the depth signal is a first depth signal, wherein the aircraft ice detector further comprises a second depth sensor positioned within the collection chamber and spaced apart from the first depth sensor, wherein the second depth sensor is configured to output a second depth signal indicating a depth of the water and/or ice collected on the baseplate, and wherein the storage subsystem holds instructions executable by the logic subsystem to:
- receive the second depth signal from the second depth sensor;
- calculate an average depth of the water and/or ice collected on the baseplate based at least on the first depth signal and the second depth signal; and
- calculate the volume of the water and/or ice collected on the baseplate based at least on the average depth and the dimensions of the baseplate.

3. The aircraft ice detector of claim 1, further comprising:
- a heating system connected to the baseplate;
- an exit door formed in the collection chamber; and
- wherein the storage subsystem holds instructions executable by the logic subsystem to:
  - after calculating the density of the water and/or ice collected on the baseplate, generate control signals operable to:
    - activate the heating system to turn any ice collected on the baseplate into water;
    - open an exit door to flush the water from the collection chamber; and
    - close the exit door after the water is flushed from the collection chamber.

4. The aircraft ice detector of claim 3, wherein:

the heating system is further connected to one or more of the collection chamber, the exit door, the depth sensor, and the mass sensor; and the storage subsystem holds instructions executable by the logic subsystem to:

generate control signals operable to periodically activate the heating system to remove any ice accretion formed on any of the collection chamber, the exit door, the depth sensor, and the mass sensor that are connected to the heating system.

5. The aircraft ice detector of claim 3, wherein an ice detection cycle comprising calculating the density of water and/or ice collected on the baseplate, generating control signals operable to activate the heating system to turn the water and/or ice into water, and generating control signals operable to open the exit door to flush the water is performed repeatedly by the aircraft ice detector according to a designated time interval.

6. The aircraft ice detector of claim 5, wherein the designated time interval is dynamically set based at least on one or more of an altitude of the aircraft and an ambient temperature.

7. The aircraft ice detector of claim 1, further comprising:

a shield door operable to transition between an open position and a closed position;

wherein the storage subsystem holds instructions executable by the logic subsystem to:

generate control signals operable to transition the shield door to the open position to allow the water and/or ice to accumulate in the collection chamber; and generate control signals operable to transition the shield door to the closed position that at least partially blocks the aperture and allows for the water and/or ice accumulated in the collection chamber to be undisturbed by air flow through the aperture while the depth of the water and/or ice is measured by the depth sensor and the mass of the water and/or ice is measured by the mass sensor.

8. The aircraft ice detector of claim 7, further comprising:

a heating system connected to the shield door;

wherein the storage subsystem holds instructions executable by the logic subsystem to:

generate control signals operable to activate the heating system while the shield door is in the closed position to remove any ice accretion formed on the shield door; and after activating the heating system, generate control signals operable to transition the shield door back to the open position.

9. The aircraft ice detector of claim 1, wherein the ice accretion signal is output to a flight deck control interface of the aircraft.

10. The aircraft ice detector of claim 1, wherein the storage subsystem holds instructions executable by the logic subsystem to:

generate control signals operable to activate an ice protection system for the surface of the aircraft based at least on the aircraft ice detector outputting the ice accretion signal.

11. A computer-implemented method for controlling an aircraft ice detector, the method comprising:

receiving, from a depth sensor of the aircraft ice detector, a depth signal indicating a depth of water and/or ice collected on a baseplate in a collection chamber of the aircraft ice detector;

receiving, from a mass sensor of the aircraft ice detector, a mass signal indicating a mass of the water and/or ice collected on the baseplate;

calculating a volume of the water and/or ice collected on the baseplate based at least on the depth signal and dimensions of the baseplate;

calculating a density of the water and/or ice collected on the baseplate based at least on the mass signal and the calculated volume of the water and/or ice collected on the baseplate; and based at least on the calculated density of the water and/or ice collected on the baseplate being less than a threshold density, outputting an ice accretion signal indicating that there is ice accretion present on a surface of the aircraft at a location of the aircraft ice detector.

12. The computer-implemented method of claim 11, wherein the depth sensor is a first depth sensor, wherein the depth signal is a first depth signal, wherein the aircraft ice detector further comprises a second depth sensor positioned within the collection chamber and spaced apart from the first depth sensor, and wherein the computer-implemented method further comprises:

receiving a second depth signal from the second depth sensor;

calculating an average depth of the water and/or ice collected on the baseplate based at least on the first depth signal and the second depth signal; and calculating the volume of the water and/or ice collected on the baseplate based at least on the average depth and the dimensions of the baseplate.

13. The computer-implemented method of claim 11, further comprising:

after calculating the density of the water and/or ice collected on the baseplate, generating control signals operable to:

activate a heating system connected to the baseplate to turn any ice collected on the baseplate into water;

open an exit door to flush the water from the collection chamber; and close the exit door after the water is flushed from the collection chamber.

14. The computer-implemented method of claim 13, wherein:

the heating system is further connected to one or more of the collection chamber, the exit door, the depth sensor, and the mass sensor; and the computer-implemented method further comprises:

generating control signals operable to activate the heating system to remove any ice accretion formed on any of the collection chamber, the exit door, the depth sensor, and the mass sensor that are connected to the heating system.

15. The computer-implemented method of claim 11, further comprising:

generating control signals operable to transition a shield door of the aircraft ice detector to an open position to allow water and/or ice to accumulate in the collection chamber; and generating control signals operable to transition the shield door to a closed position that at least partially blocks an aperture and allows for the water and/or ice accumulated in the collection chamber to be undisturbed by air flow through the aperture while the depth of the water and/or ice is measured by the depth sensor and the mass of the water and/or ice is measured by the mass sensor.

16. The computer-implemented method of claim 15, further comprising:

generating control signals operable to activate a heating system connected to the shield door while the shield door is in the closed position to remove any ice accretion formed on the shield door; and after activating the heater, generating control signals operable to transition the shield door back to the open position.

17. The computer-implemented method of claim 11, further comprising:

generating control signals operable to activate an ice protection system for the surface of the aircraft based at least on the aircraft ice detector outputting the ice accretion signal.

18. An ice detection system for an aircraft, comprising:

a plurality of aircraft ice detectors positioned at different locations on a surface of the aircraft, wherein each aircraft ice detector comprises:

a collection chamber forming an aperture configured to receive water and/or ice impinging on the surface of the aircraft;

a baseplate positioned within the collection chamber and configured to collect the water and/or ice that enters through the aperture formed in the collection chamber;

a depth sensor positioned within the collection chamber and configured to output a depth signal indicating a depth of the water and/or ice collected on the baseplate; and a mass sensor configured to output a mass signal indicating a mass of the water and/or ice collected on the baseplate; and a computing system comprising:

a logic subsystem; and a storage subsystem holding instructions executable by the logic subsystem to:

for each aircraft ice detector of the plurality aircraft ice detectors, receive the depth signal from the depth sensor;

receive the mass signal from the mass sensor;

calculate a volume of the water and/or ice collected on the baseplate based at least on the depth signal and dimensions of the baseplate;

calculate a density of the water and/or ice collected on the baseplate based at least on the mass signal and the calculated volume of the water and/or ice collected on the baseplate; and based at least on the calculated density of the water and/or ice collected on the baseplate being less than a threshold density, output an ice accretion signal indicating that there is ice accretion present on the surface of the aircraft at a location of the corresponding aircraft ice detector.

19. The ice detection system of claim 18, wherein, for each aircraft ice detector of the plurality aircraft ice detectors, the ice accretion signal is output to a flight deck control interface of the aircraft.

20. The ice detection system of claim 18, wherein the storage subsystem holds instructions executable by the logic subsystem to:

generate control signals operable to activate an ice protection system associated with the corresponding aircraft ice detector based at least on the computing system outputting the ice accretion signal.

* * * * *